(12) United States Patent
Gao et al.

(10) Patent No.: US 8,757,690 B2
(45) Date of Patent: Jun. 24, 2014

(54) RECONFIGURABLE GRIPPING DEVICE

(71) Applicant: GM Global Technology Operation LLC, Detroit, MI (US)

(72) Inventors: Dalong Gao, Rochester, MI (US); Jianying Shi, Oakland Township, MI (US); Lance T. Ransom, Essex (CA); Richard Clemence Janis, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/782,301

(22) Filed: Mar. 1, 2013

(65) Prior Publication Data

US 2014/0021731 A1    Jan. 23, 2014

Related U.S. Application Data

(60) Provisional application No. 61/673,876, filed on Jul. 20, 2012.

(51) Int. Cl.
*B25J 15/08* (2006.01)

(52) U.S. Cl.
USPC .......................................... 294/198; 294/106

(58) Field of Classification Search
USPC .......................... 294/106, 111, 198, 200, 213; 901/36–39; 623/64
See application file for complete search history.

(56) References Cited

U.S. PATENT DOCUMENTS

| | | | | |
|---|---|---|---|---|
| 3,139,302 | A * | 6/1964 | Orloff et al. ................... | 294/198 |
| 3,921,445 | A * | 11/1975 | Hill et al. ................. | 73/862.043 |
| 4,350,381 | A * | 9/1982 | Hellmann ...................... | 294/208 |
| 4,367,891 | A * | 1/1983 | Wauer et al. .................. | 294/197 |
| 5,762,390 | A | 6/1998 | Gosselin et al. | |
| 7,556,299 | B2 * | 7/2009 | Koyama ........................ | 294/106 |
| 7,795,832 | B2 * | 9/2010 | Kawabuchi et al. ..... | 318/568.11 |
| 8,469,424 | B2 * | 6/2013 | Takenaka et al. ............. | 294/198 |
| 2008/0023974 | A1 * | 1/2008 | Park et al. ..................... | 294/106 |

* cited by examiner

*Primary Examiner* — Dean Kramer
(74) *Attorney, Agent, or Firm* — Quinn Law Group, PLLC

(57) ABSTRACT

A reconfigurable gripping device for securely gripping, lifting, and transporting a work piece is provided. The reconfigurable gripping device may include at least a first finger and a second finger each secured to a base platform with a base support. Each of the respective fingers may have a first link, a second link, and a third link each having a corresponding drive mechanism to individually drive the respective link. The first link drive mechanism and second link drive mechanism are configured to control the grasp and adaptability of each of the respective fingers to place the third link upon a work piece. The third link drive mechanism is configured to drive the third link of each of the respective fingers to apply a clamping force upon the work piece.

20 Claims, 4 Drawing Sheets

RECONFIGURABLE GRIPPING DEVICE

CROSS-REFERENCE TO RELATED APPLICATIONS

This application claims the benefit of U.S. Provisional Application No. 61/673,876, filed Jul. 20, 2012, which is hereby incorporated by reference in its entirety.

TECHNICAL FIELD

The invention relates to reconfigurable gripping devices, more particularly robotic fingers, for securely gripping, grasping, and transporting objects in industrial applications, such as for movement through an assembly process.

BACKGROUND

Industrial manufacturing processes often include repetitive gripping, lifting, and transportation of work pieces that are too heavy, too large, too fragile, or must be placed with too high precision to be placed without mechanical assistance. The gripping or grasping, transportation, and placement of these work pieces may be accomplished manually or through automated means with material handling devices. Gripping devices allow heavy, large, and complex work pieces to be transported through manufacturing processes with increased reliability and efficiency.

Conventional clamps provide a continuous large clamping force and can adapt to small panel rotations with the use of a swivel head. However, conventional clamps are not easily adaptable to a multitude of differently styled work pieces. Conventional clamps often must be designed for a specific task or be fitted with several different end effectors depending on the style of the work piece at issue.

Reconfigurable mechanical grippers, or conventional robotic fingers, include a series of rigid links. This series of rigid links attempts to adapt to variations in clamping position. However, the adaptability of these grippers may not be sufficient to fit the shape of a multitude of differently styled work pieces, especially if the gripper is under-actuated. Such under-actuated grippers have an extremely low gripping force of less than fifteen pounds on average. These reconfigurable mechanical grippers are more aptly designed to wrap around or envelop a spherical work piece. Yet, because there is no actuation once clamped, the reconfigurable mechanical gripper cannot sufficiently clamp a work piece during transit.

SUMMARY

A unique reconfigurable gripping device for securely gripping, lifting, and transporting a work piece, which provides increased flexibility and preserves floor space, during assembly, is provided. The reconfigurable gripping device may include a plurality of fingers, including at least a first finger and a second finger each secured to a base platform with a base support. Each of the respective fingers may have a first link, a second link, and a third link, each having a corresponding drive mechanism to individually drive the respective link. The first link drive mechanism and second link drive mechanism are configured to control the grasp and adaptability of each of the respective fingers to place the third link upon a work piece. The third link drive mechanism is configured to drive the third link of each of the respective fingers to apply a clamping force upon the work piece.

The reconfigurable gripping device may also include a plurality of first actuators secured to a plurality of base platforms adapted to be supported on a base structure. The plurality of first actuators is configured to power the first link drive mechanism; a plurality of second actuators configured to power the second link drive mechanism. The reconfigurable gripping device also includes a third actuator configured power the third link drive mechanism.

Each of the respective fingers may have a plurality of finger links, which allow for at least three degrees of freedom to approximate the movement of a human finger. The plurality of links allows flexibility in the gripping device to adapt to a multitude of differently styled work pieces and transport those work pieces within a larger range of motion.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
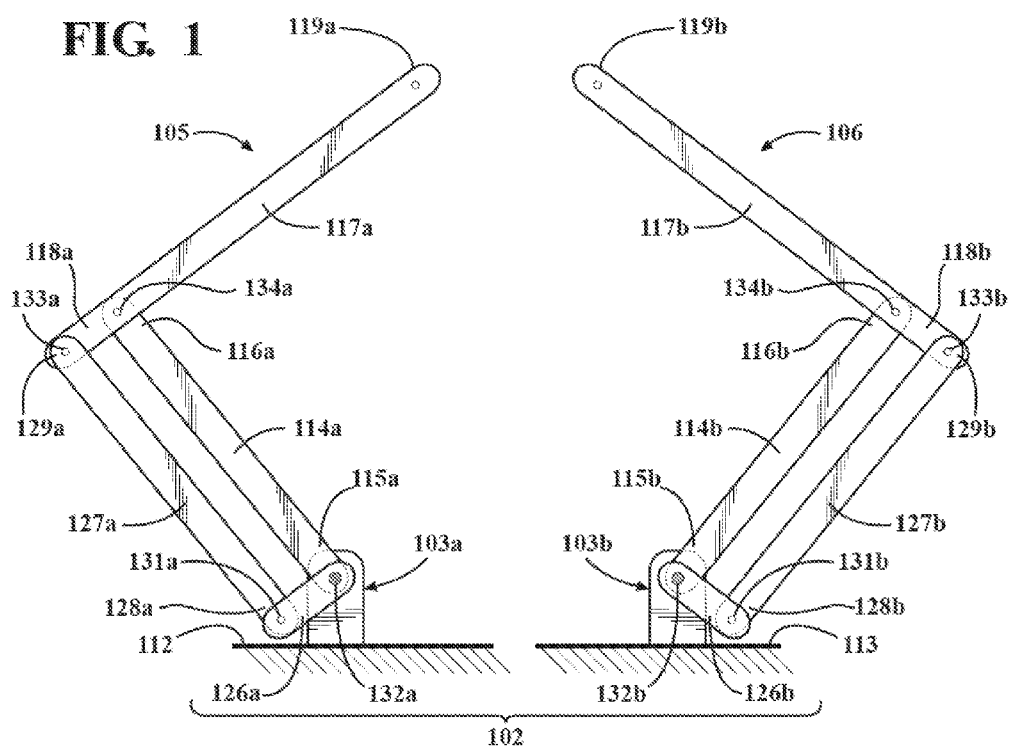
FIG. 1 is a schematic elevation view of an example embodiment of the reconfigurable gripping device wherein each of the respective first link and second link of the plurality of fingers are individually driven by the first link drive mechanism and the second link drive mechanism respectively, the first link drive mechanism and second link drive mechanism are powered by electric motors placed at the base of each of the plurality of fingers.

Referring to FIGS. 1-5, wherein like reference numbers correspond to like or similar components throughout the several views, a reconfigurable gripping device 100 for securely gripping, lifting, and transporting a work piece 101, such as an automotive body panel or the like, is provided. The reconfigurable gripping device 100 may provide increased flexibility and preserve floor space, when operating to assemble a product. The reconfigurable gripping device 100 includes a plurality of base platforms 112, 113, a plurality of base supports 103a, 103b, 104a, 104b; a plurality of fingers 105, 106; a first link drive mechanism 123, a second link drive mechanism 125; and a third link drive mechanism 149.

The plurality of finger base platforms 112, 113 may be adapted to be supported on a base structure 102. The plurality of finger base platforms 112, 113 may include a first platform 112 and a second platform 113. However, while two platforms 112, 113 are shown, it is to be understood that the plurality of base platforms 112, 113 may include any number of platforms, the number of platforms is equal to the number of fingers present in the plurality of fingers 105, 106 of the reconfigurable gripping device 100. The first platform 112 and the second platform 113 may be operatively connected by a third actuator 111. A plurality of finger base supports 103a, 103b, 104a, 104b adapted to be supported by the plurality of base platforms 112, 113. The plurality of finger base supports may include a first base support 103a, 103b, a second base support 104a, 104b associated with each of the first finger 105 and second finger 106.

The plurality of fingers may include a first finger 105 and a second finger 106. While only two fingers 105, 106 are shown in each of the respective figures, by way of illustration, it is to be understood that the plurality of fingers 105, 106 may include any number of fingers 105, 106 greater than one. Each of the first finger 105 and second finger 106 may include a plurality of links, the plurality of links including at least a first link 114a, 114b having a first link base end 115a, 115b and a first link distal end 116a, 116b; a second link 117a, 117b, having a second link base end 118a, 118b and a second link distal end 119a, 119b; and a third link 120a, 120b, having a third link base end 121a, 121b and a third link distal end 122a, 122b.

Figure 2:
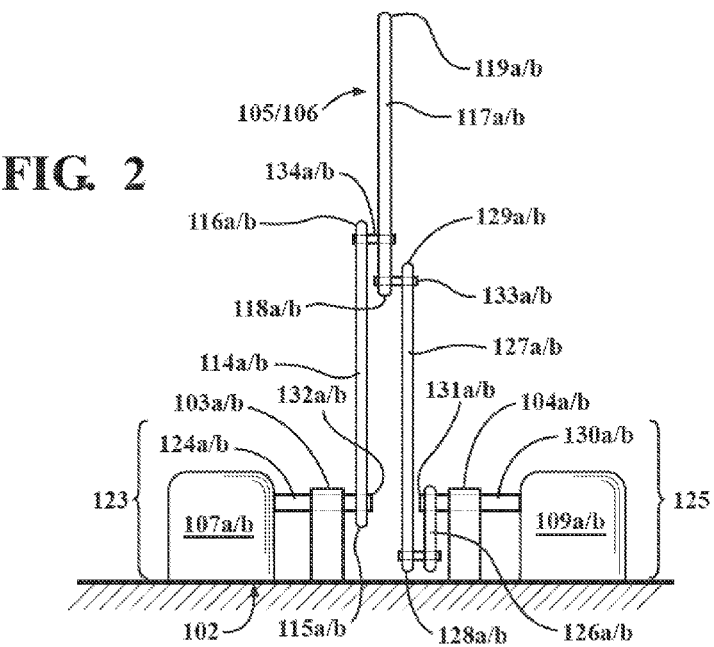
FIG. 2. is a schematic top view of an example embodiment of the first link drive mechanism and the second link drive mechanism of one of the plurality of fingers.

Referring to FIGS. 1 and 2, the first link 114a, 114b may be individually driven by the first link drive mechanism 123. The second link may be individually driven by the second link drive mechanism 125. A driving force is produced by each of the first link drive mechanism 123 and the second link drive mechanism 125. Each of the respective fingers 105, 106 functions with at least three degrees of freedom. These degrees of freedom allow the reconfigurable gripping device 100 to wrap around or envelop a spherical work piece 101 and further allows the gripping device 100 the freedom to position the third link 120a, 120b (shown in FIGS. 3-5) of each of the respective first finger 105 and second finger 106 to securely grasp a multitude of differently styled and differently sized work pieces 101, with a sufficient clamping force.

The first link 114a, 114b of each of the respective first finger 105 and second finger 106 may be directly driven by a first link drive mechanism 123, which may be powered by one of a first plurality of actuators 107a, 107b. The first plurality of actuators 107a, 107b may include a plurality of electric motors or the like. The electric motors may include a gearbox (not shown) and a first rotatable output connection shaft 124a, 124b. The first rotatable output connection shaft 124a, 124b may connect the first link base end 115a, 115b to the first base support 103a, 103b at a first joint 132a, 132b. The first rotatable output connection shaft 124a, 124b may be configured to transmit torque to the first link base end 115a, 115b to directly and individually drive the first link 114a, 114b.

The first plurality of actuators 107a, 107b may include a first electric motor 107a and a second electric motor 107b. The first electric motor 107a may be secured to first base support 103a of the first finger 105 proximal to the first link base end 115a of the first finger 105, at a first finger first pin connection joint 132a. The second electric motor 107b may be secured to the first base support 103b of the second finger 106 proximal to the first link base end 115b of the second finger 106 at a second finger first pin connection joint 132b.

The second link 117a, 117b of each of the respective first finger 105 and second finger 106 may be driven by the second link driving mechanism 125 and powered by one of a second plurality of actuators 109a, 109b. The second link drive mechanism 125 may include a first drive link 126a, 126b and a first drive coupling link 127a, 127b. The first drive coupling link 127a, 127b may include a base end 128a, 128b and a distal end 129a, 129b.

The second link drive mechanism 125 may be powered by one of the second plurality of actuators 109a, 109b. The second plurality of actuators 109a, 109b may include a plurality of electric motors or the like. Each of the electric motors may include a gear box (not shown) and a second output connection shaft 130a, 130b. The second output connection shaft 130a, 130b of each of the second plurality of electric motors 109a, 109b may operatively connect the first drive link 126a, 126b to the one of the plurality of second base supports 104a, 104b and be configured to transmit torque to the first drive link 126a, 126b from one of the second plurality of electric motors 109a, 109b. The first drive link 126a, 126b may also be operatively connected to the first drive coupling link base end 128a, 128b at a second pin connection joint 131a, 131b. The first drive coupling link 127a, 127b may be operatively connected at its distal end 129a, 129b to the second link base end 118a, 118b at a third pin connection joint 133a, 133b. The second link base end 118a, 118b may be operatively connected to the first link distal end 116a, 116b at a fourth pin connection joint 134a, 134b. The first drive coupling link 127a, 127b may be configured to transmit torque from one of the second plurality of actuators 109a, 109b to the second link 117a, 117b, to individually drive the second link 117a, 117b.

The second plurality of actuators 109a, 109b may include a third electric motor 109a and a fourth electric motor 109b. As shown in FIGS. 1 and 2, the third electric motor 109a may be secured to the second base support 104a of the first finger 105 proximal to the first drive coupling link base end 128a of the first finger 105; and the fourth electric motor 109b may be secured to the second base support 104b of the second finger 106 proximal to the first drive coupling link base end 128b of the second finger 106.

In lieu of a first drive link 126a, 126b and a first drive coupling link 127a, 127b the second link drive mechanism 125 may include a plurality of robotic tendons (not shown) or other similar flexible members such as cables or the like (not shown). In such a configuration, each of the tendons (not shown) may operatively connect to the second output connection shaft 130 and the second link 117a, 117b at the first finger 105 third pin connection joint 133a and the second finger 106 third pin connection joint 133b. The tendons (not shown) may convert the rotary motion of each of the second plurality of actuators, namely the third electric motor 109a and the fourth electric motor 109b, into linear motion to individually drive the second links 117a, 117b of each of the respective first finger 105 and second finger 106.

A first tendon (not shown) may be operatively connected to the second link 117a, 117b of each of the respective fingers 105, 106 such that tension in the first tendon (not shown) urges the second link 117a, 117b to rotate in a first direction to contract the finger or cause the finger to fold and grasp an object. A second tendon (not shown) may be operatively connected to the second link 117a, 117b such that tension in the second tendon (not shown) urges the second link 117a, 117b to rotate in a second direction to retract or open the finger 105, 106.

Rather than positioning the second plurality of actuators 109a, 109b proximate the one of the second base supports 104a, 104b, the second link drive mechanism 125 may be configured to directly drive the second link 117a, 117b. In such an alternate configuration, the third electric motor 109a and fourth electric motor 109b may be alternatively located proximate to the first link distal end 116a, 116b and the second link base end 118a, 118b of each of the first finger 105 and second finger 106 and be configured to individually and directly drive the second link 117a, 117b. The third electric motor 109a may be located proximate the first link distal end 116a and the second link base end 118a of the first finger 105 (shown in phantom in FIG. 5); and the fourth electric motor 109b may be located proximate the first link distal end 116b and the second link base end 118b of the second finger 106 (shown in phantom in FIG. 5).

Figure 3:
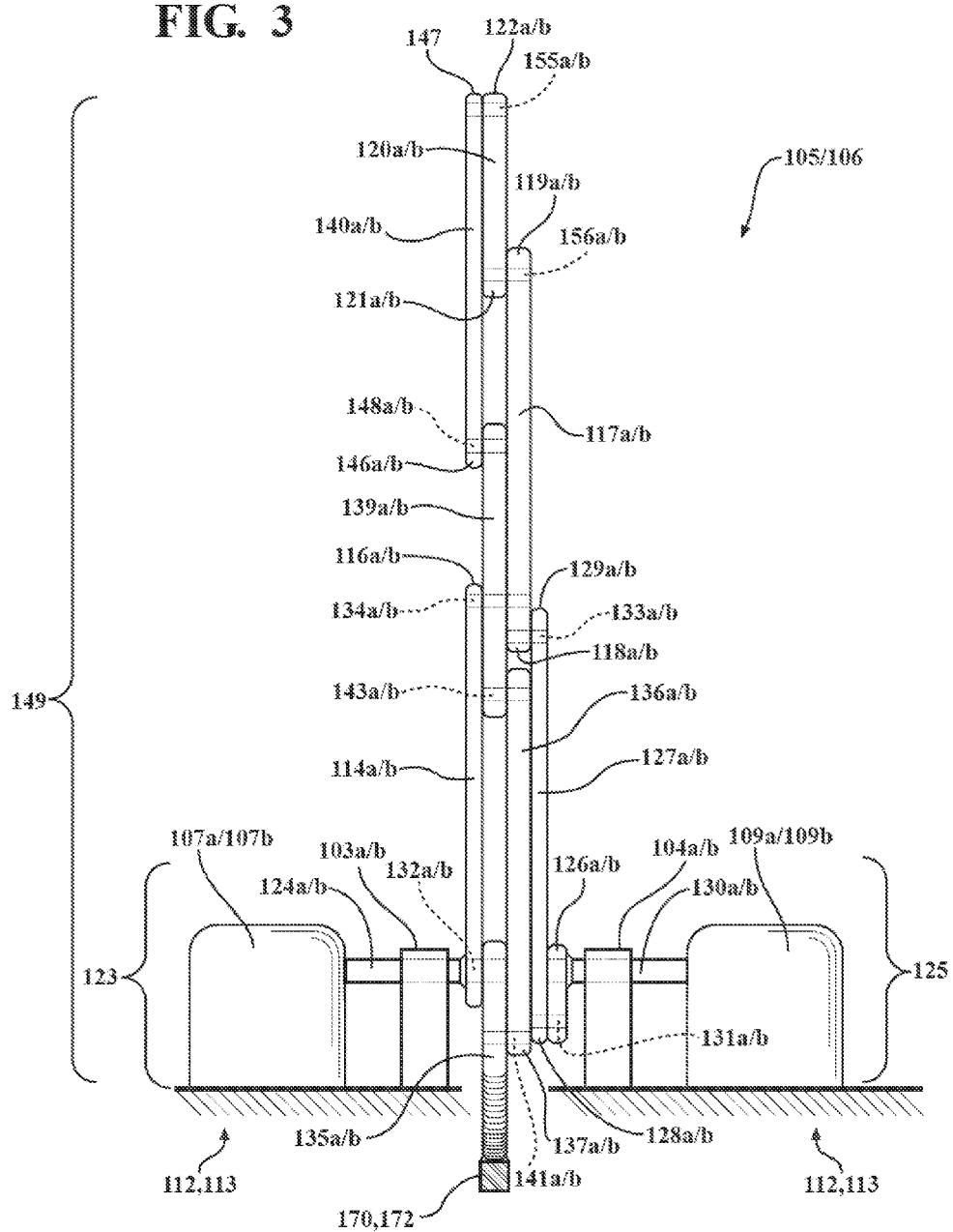
FIG. 3 is a schematic top view of an example embodiment of the third link drive mechanism of one of the plurality of fingers.
Figure 4:
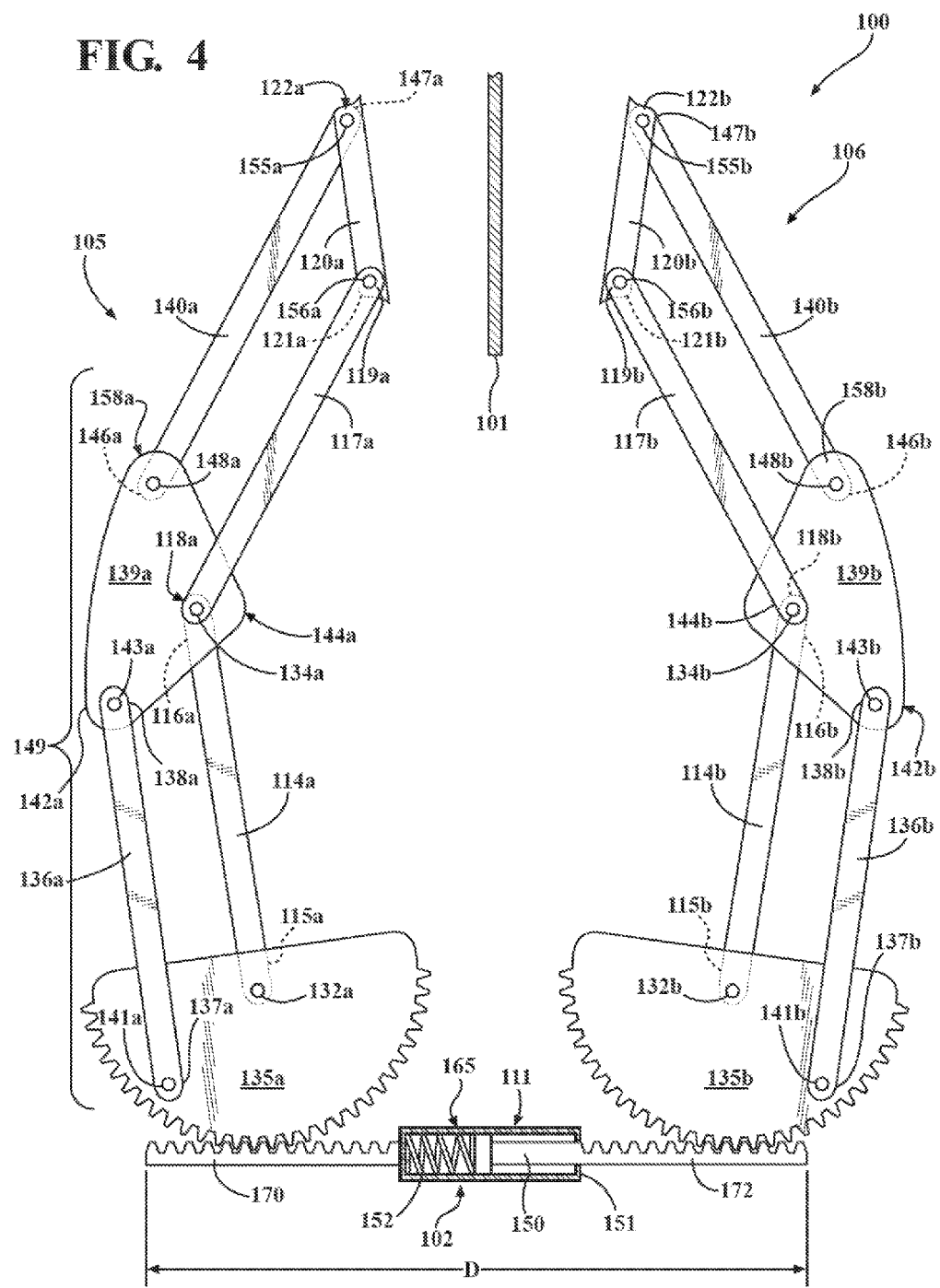
FIG. 4 is a schematic elevation view of an example embodiment of the third link drive mechanism, wherein the third link drive mechanism of each of the respective fingers is driven by a pneumatic cylinder shown as a single-acting pneumatic cylinder in a contracted and idle position.
Figure 5:
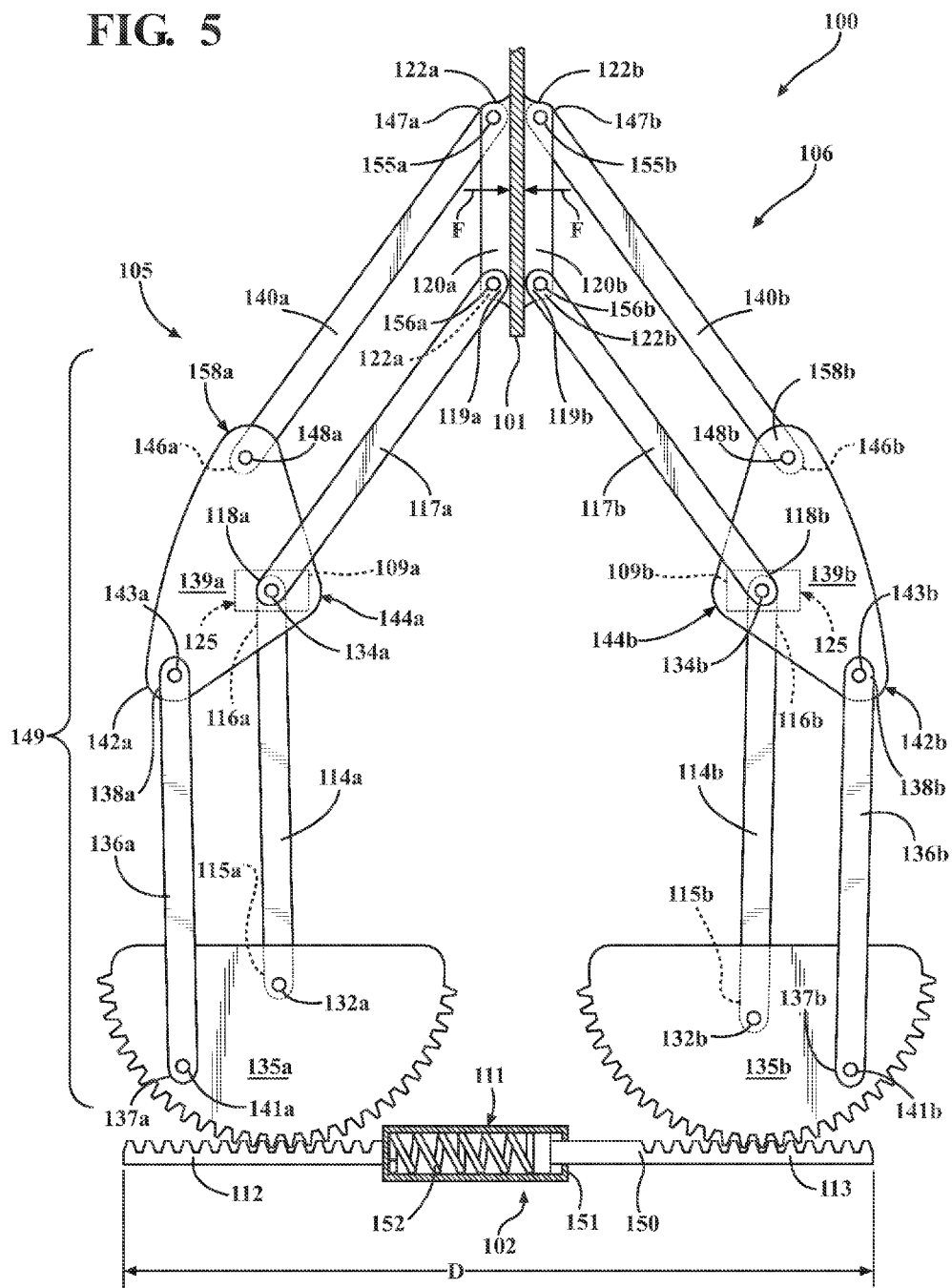
FIG. 5 is a schematic elevation view of an example embodiment of the third link drive mechanism, wherein the third link drive mechanism of each of the respective fingers is driven by a pneumatic cylinder shown as a single-acting pneumatic cylinder in an extended and actuated position, the work piece shown clamped between the third links of the plurality of fingers.

Referring to FIGS. 3-5, each of the first finger 105 and second finger 106 may include a third link drive mechanism 149, which may produce and control a clamping force F of the reconfigurable gripping device 100. The third link drive mechanism 149 may include a rotatable half gear 135a, 135b mounted upon one of the plurality of platforms 112, 113, adapted to be supported by the base structure 102; a second drive coupling link 136a, 136b having a base end 137a, 137b and a distal end 138a, 138b; a second drive link 139a, 139b, having a first attachment point 144a, 144b, second attachment point 142a, 142b, and third attachment point 158a, 158b; and a third drive coupling link 140a, 140b having a base end 146a, 146b and a distal end 147a, 147b.

The rotatable half gear 135a, 135b may operatively connect the third link drive mechanism 149 to one of the plurality of base platforms 112, 113. The rotatable half gear 135a, 135b may rotate about the first rotatable output connection shaft 124a, 124b at the first pin connection joint 132a, 132b of each of the respective first finger 105 and second finger 106. The rotatable half gear 135a, 135b may also be connected to the second drive coupling link base end 137a, 137b at a fifth pin connection joint 141a, 141b of each of the respective first finger 105 and second finger 106.

The second output connection shaft 130a, 130b of each of the second plurality of actuators 109a, 109b may operatively connect the first drive link 126a, 126b to the one of the second base supports 104a, 104b. The first drive link 126a, 126b may also be operatively connected to the first drive coupling link base end 128a, 128b at a second pin connection joint 131a, 131b. The first drive coupling link 127a, 127b may be operatively connected at its distal end 129a, 129b to the second link base end 118a, 118b at a third pin connection joint 133a, 133b. The second link base end 118a, 118b may be operatively connected to the first link distal end 116a, 116b and the first attachment point 144a, 144b of the second drive link 139a, 139b, at a fourth pin connection joint 134a, 134b. The second drive link 139a, 139b may further rotate about the fourth pin connection 134a, 134b.

The second drive link 139a, 139b may additionally be operatively connected to the second drive coupling link distal end 138a, 138b at the second attachment point 142a, 142b at a sixth pin connection joint 143a, 143b. The second drive link 139a, 139b may be further operatively connected, at the third attachment point 158a, 158b to the third drive coupling link base end 146a, 146b at a seventh pin connection joint 148a, 148b.

The third drive coupling link distal end 147a, 147b may be operatively connected to the third link distal end 122a, 122b at an eighth pin connection joint 155a, 155b. The third link base end 121a, 121b may be operatively connected to the second link distal end 119a, 119b at a ninth pin connection joint 156a, 156b.

As shown FIG. 4 and FIG. 5, the reconfigurable gripping device 100 may include a third actuator 111 configured to drive the third link drive mechanism 149. The third actuator 111 may be a pneumatic cylinder or the like having a first extension element 170 and a second extension element 172. The rotatable half gear 135a of the first finger 105 coupled to the first extension element 170 for movement therewith and the rotatable half gear 135b of the second finger 106 coupled to the second extension element 172 for movement therewith.

The third actuator 111 may be a single-acting pneumatic cylinder which may create a pneumatically powered driving force, through the displacement of a pneumatic cylinder shaft 150 to an extended position 167, outside of an exterior cylinder housing 151, as shown in FIG. 5, in one lateral direction. The single-acting pneumatic cylinder 111 may utilize a spring 152 powered retraction force to return to the shaft 150 to its home position 165 inside the exterior cylinder housing 151, as shown in FIG. 4. The third actuator 111 is shown in FIGS. 4, and 5, as a single-acting pneumatic cylinder 111.

The third actuator 111 may, alternatively, be a double-acting pneumatic cylinder, which may include two ports for air admittance (not shown) and one port for air remittance (not shown). The double-acting pneumatic cylinder 111 may use a pneumatic driving force to move the pneumatic cylinder shaft 150 between the extended position 167 and the home position 165, in two lateral directions (i.e. expansion and retraction).

The third actuator 111 may drive the third links 120a, 120b of each of the respective first finger 105 and second finger 106. The pneumatic cylinder 111 may move between the base platforms 112, 113 and along the base structure 102 to enable the reconfigurable gripping device 100 to adapt to a multitude of work pieces 101 and place the third links 120a, 120b upon the work piece 101 with the requisite precision. This linear motion of the pneumatic cylinder 111 may be passive, i.e. mounted on a freely moving slide or driven by a separate linear actuator (not shown) to move the pneumatic cylinder 111 to a specific position upon the specified work piece 101.

Further, the pneumatic cylinder 111 may be configured to extend the pneumatic cylinder shaft 150 thereby increasing the linear dimension (D) between the first extension element 170 coupled with the rotatable half gear 135a of the first finger 105 and the second extension element 172 coupled with rotatable half gear 135b of the second finger 106, along the base structure 102. The increase in the linear dimension (D) between the first extension element 170 and the second extension element 172 may transmit torque to the rotatable half gears 135a, 135b which may actuate the third link drive mechanism 149 and thereby transmit a clamping force F upon the work piece 101 via the third links 120a, 120b of each of the respective first finger 105 and second finger 106. The clamping force F facilitated by the pneumatic cylinder 111 to the third links 120a, 120b may result in up to one hundred and fifty (150) pounds of clamping force. In one example embodiment of a conventional reconfigurable mechanical gripper, with the requisite degrees of freedom provided, may only produce up to fifteen pounds of clamping force during the execution of a pinch grasp.

After grasping the work piece 101, the reconfigurable gripping device 100 may maneuver the work piece 101 within a selected area. The reconfigurable gripping device 100 may selectively place and set the work piece 101 in the desired location in the respective assembly. The reconfigurable gripping device 100 may then release the work piece 101. In releasing the work piece 101, the pneumatic cylinder shaft 150 is returned to its home position 165 within the exterior cylinder housing 151. The return of the pneumatic cylinder shaft 150 within the exterior cylinder housing 151 retracts the linear dimension (D) between first extension element 170 and the second extension element 172, along the base structure 102, thereby rotating the rotatable half gears 135a, 135b associated with each of the respective first finger 105 and second finger 106. The rotation of the rotatable half gears 135a, 135b releases the clamping force F applied by each of the respective third links 120a, 120b upon the work piece 101. After the pneumatic cylinder shaft 150 of the third actuator 111 returns to its home position 165 the exterior cylinder housing 151, the first drive link mechanism 123 and second drive link mechanism 125 are actuated and configured to open each of the respective first finger 105 and second finger 106 to release and retract the reconfigurable gripping device 100 from the work piece 101.

The combination of the range of motion, flexibility and enhanced clamping force allows the reconfigurable gripping device 100 to secure multiple styled work pieces 101 in a variety of locations. Additionally, the reconfigurable gripping device 100 can securely maneuver and place a multitude of differently styled work pieces 101 without the need to change or reselect a new gripper end-effector for each style of work piece 101. This allows for one machine to serve multiple purposes in assembly and reduce the necessary floor space required for assembly of a product.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A reconfigurable gripping device for gripping, lifting, and transporting a work piece, comprising:
    a plurality of base platforms adapted to be supported on a base structure;
    a first plurality of base supports and a second plurality of base supports, each of the base supports connected to one of the base platforms;
    a plurality of fingers including at least a first finger and a second finger, each of the respective fingers having a plurality of links including at least a first link, a second link, and a third link, each of the respective links having a base end and a distal end, each of the plurality of fingers being secured to one of the plurality of base platforms with one of the plurality of base supports;
    a first link drive mechanism configured to individually and directly drive the first link of one of the respective fingers, the first drive link mechanism including one of a first plurality of actuators secured to the plurality of base platforms;
    a second link drive mechanism configured to individually drive the second link of one of the respective fingers, the second link drive mechanism including one of a second plurality of actuators secured to the plurality of base platforms;
    a third link drive mechanism configured to individually drive the third link of one of the respective fingers;
    wherein the first link drive mechanism and second link drive mechanism are further configured to control the grasp and adaptability of one of the respective fingers to place the third link upon the work piece; and
    wherein the third link drive mechanism is configured to drive the third link of one of the respective fingers to apply a sufficient clamping force upon the work piece to enable the device to grip, lift, and transport the work piece.

2. The reconfigurable gripping device of claim 1 wherein the plurality of base platforms includes at least a first base platform configured to secure the first finger to the base structure and a second base platform configured to secure the second finger to the base structure.

3. The reconfigurable gripping device of claim 2 wherein:
    the first plurality of actuators includes a gearbox and a first rotatable output shaft that extends from one of the first plurality of actuators through one of the first plurality of base supports and is operatively connected to the first link base end of the first link of one of the plurality of fingers;
    the second link drive mechanism further includes:
        the second plurality of actuators each having a gearbox and a second rotatable output shaft, the second plurality of actuators configured to power the second link of one of the plurality of fingers;
        a first drive link operatively connected to the second rotatable output shaft and configured to transmit torque from one of the second plurality of actuators to the second link of one of the plurality of fingers; and
        a first drive coupling link operatively coupling the first drive link and the second link of one of the plurality of fingers and configured to transmit torque from the second rotatable output shaft to the second link.

4. The reconfigurable gripping device of claim 3 wherein the first plurality of actuators is a first plurality of electric motors.

5. The reconfigurable gripping device of claim 4 wherein the first plurality of electric motors includes at least a first electric motor and a second electric motor, the first electric motor secured to the first base platform and the second electric motor secured to the second base platform.

6. The reconfigurable gripping device of claim 3 wherein the second plurality of actuators is a second plurality of electric motors.

7. The reconfigurable gripping device of claim 6 wherein the second plurality of electric motors includes at least a third electric motor and a fourth electric motor, the third electric motor secured to the first base platform and the fourth electric motor secured to the second base platform.

8. The reconfigurable gripping device of claim 2 wherein the third link drive mechanism includes:
    a third actuator having a first extension element and a second extension element positioned between the first base platform and the second base platform, the third actuator configured to linearly extend the distance between the first extension element and the second extension element;
    at least one rotatable half gear operatively connected to the first link base end of one of the first finger and second finger and coupled to and configured for movement with one of the first extension element and the second extension element, the at least one rotatable half gear configured to rotate when the linear distance between the first extension element and second extension element is extended by the third actuator;
    a second drive coupling link having a second drive coupling link base end and a second drive coupling link distal end and operatively connected to the at least one rotatable half gear at the second drive coupling link base end, the second drive coupling link configured to receive torque from the at least one rotatable half gear;
    a second drive link having a first attachment point, a second attachment point, and a third attachment point, the second drive link operatively connected to the second drive coupling link distal end at the second attachment point, the second drive link operatively connected to the first link distal end and the second link base end at the first attachment point, the second drive link configured to receive torque from the first link and the second drive coupling link;

a third drive coupling link having a third drive coupling link base end and a third drive coupling link distal end, the third drive coupling link operatively connected to the third attachment point of the second drive link at the third drive coupling link base end and operatively connected to the third link distal end at the third drive coupling link distal end, the third drive coupling link configured to receive torque from the second drive link and transmit torque to the third link; and the second link operatively connected to the first attachment point of the second drive link at the second link base end and operatively connected to the third link base end at the second link distal end.

9. The reconfigurable gripping device of claim 8 wherein the third actuator is a pneumatic cylinder.

10. The reconfigurable gripping device of claim 9 wherein the third actuator is a single-acting pneumatic cylinder.

11. The reconfigurable gripping device of claim 9 wherein the third actuator is a double-acting pneumatic cylinder.

12. A reconfigurable gripping device for gripping, lifting, and transporting a work piece, comprising:
    a plurality of base platforms adapted to be supported on a base structure;
    a plurality of base supports and a second plurality of base supports, each of the base supports connected to one of the base platforms;
    a plurality of fingers including at least a first finger and a second finger, each of the respective fingers having a plurality of links including at least a first link, a second link, and a third link, each of the respective links having a base end and a distal end, each of the plurality of fingers being secured to one of the plurality of base platforms with one of the plurality of base supports;
    a first link drive mechanism configured to individually and directly drive the first link of one of the respective fingers, wherein the first drive link mechanism includes a first plurality of actuators secured to the plurality of base platforms, each of the first plurality of actuators having a gearbox and a first rotatable output shaft that extends from one of the first plurality of actuators through one of the first plurality of base supports and is operatively connected to the first link base end of the first link of one of the plurality of fingers;
    a second link drive mechanism configured to individually drive the second link of one of the respective fingers, wherein the second link drive mechanism includes one of a second plurality of actuators configured to directly and individually drive the second link of one of the plurality of fingers, each of the respective second plurality of actuators positioned between the first link distal end and the second link base end of one of the plurality of fingers; and
    a third link drive mechanism configured to individually drive the third link of one of the respective fingers, the third link drive mechanism including:
        a third actuator having a first extension element and a second extension element positioned between the first base platform and the second base platform, the third actuator configured to linearly extend the distance between the first extension element and the second extension element;
        at least one rotatable half gear operatively connected to the first link base end of one of the first finger and second finger and coupled to and configured for movement with one of the first extension element and the second extension element, the at least one rotatable half gear configured to rotate when the linear distance between the first extension element and second extension element is extended by the third actuator;
    wherein the first link drive mechanism and second link drive mechanism are further configured to control the grasp and adaptability of one of the respective fingers to place the third link upon the work piece; and
    wherein the third link drive mechanism is configured to drive the third link of one of the respective fingers to apply a sufficient clamping force upon the work piece to enable the device to grip, lift, and transport the work piece.

13. The reconfigurable gripping device of claim 12 wherein the plurality of base platforms includes at least first base platform configured to secure the first finger to the base structure and a second base platform configured to secure the second finger to the base structure.

14. The reconfigurable gripping device of claim 13 wherein the first plurality of actuators is a first plurality of electric motors.

15. The reconfigurable gripping device of claim 14 wherein the first plurality of electric motors includes at least a first electric motor and a second electric motor, the first electric motor secured to the first base platform and the second electric motor secured to the second base platform.

16. The reconfigurable gripping device of claim 12 wherein the second plurality of actuators is a second plurality of electric motors.

17. The reconfigurable gripping device of claim 16 wherein the second plurality of electric motors includes at least a third electric motor and a fourth electric motor, the third electric motor positioned between the first link distal end and the second link base end of the first finger and the fourth electric motor positioned between the first link distal end and the second link base end of the second finger.

18. A reconfigurable gripping device for gripping, lifting, and transporting a work piece, comprising:
    a first base platform and a second base platform adapted to be supported on a base structure, a first base support operatively connected to the first base platform, and a second base support operatively connected to the second base platform;
    a plurality of fingers including at least a first finger and a second finger, the first finger secured to the first base platform with the first base support and the second finger secured to the second base platform with the second base support, each of the first finger and second finger having a plurality of links including at least a first link, a second link, and a third link, each of the links having a base end and a distal end;
    a first link drive mechanism configured to individually and directly drive the first link of each of the respective fingers, the first link drive mechanism including a first plurality of actuators secured to one of the first base platform and second base platform, each of the first plurality of actuators having a gearbox and first rotatable output shaft that extends from one of the first plurality of actuators through one of the first base support and second base support and is operatively connected to the first link base end of one of the first finger and second finger;
    a second link drive mechanism configured to individually drive the second link of each of the respective fingers, the second link drive mechanism including:
        a second plurality of actuators each having a gearbox and a second rotatable output shaft, the second plurality of actuators configured to power the second link of one of the first finger and second finger;

a first drive link operatively connected to the second rotatable output shaft and configured to transmit torque from one of the second plurality of actuators to the second link; and a first drive coupling link operatively coupling the first drive link and the second link of one of the first finger and second finger;

a third link drive mechanism configured to individually drive the third link of each of the respective fingers, the third link drive mechanism including:

a third actuator having a first extension element and a second extension element, the third actuator positioned between the first base platform and the second base platform, the third actuator configured to linearly extend the distance between the first extension element and the second extension element;

at least one rotatable half gear operatively connected to the first link base end of one of the first finger and second finger and coupled to and configured for movement with one of the first extension element and the second extension element, the at least one rotatable half gear configured to rotate when the linear distance between the first extension element and second extension element is extended by the third actuator;

a second drive coupling link having a second drive coupling link base end and a second drive coupling link distal end operatively connected to the at least one rotatable half gear at the second drive coupling link base end, the second drive coupling link configured to receive torque form the rotatable half gear;

a second drive link having a first attachment point, a second attachment point, and a third attachment point, the second drive link operatively connected to the second drive coupling link distal end at the second attachment point, the second drive link operatively connected to the first link distal end and the second link base end at the first attachment point, the second drive link configured to receive torque from the first link and the second drive coupling link;

a third drive coupling link having a third drive coupling link base end and a third drive coupling link distal end, the third drive coupling link operatively connected to the third attachment point of the second drive link at the third drive coupling link base end and operatively connected to the third link distal end at the third drive coupling link distal end, the third drive coupling link configured to receive torque from the second drive link and transmit torque to the third link; and the second link operatively connected to the first attachment point of the second drive link at the second link base end and operatively connected to the third link base end at the second link distal end; and wherein the first link drive mechanism and second link drive mechanism are further configured to control the grasp and adaptability of each of the first finger and second finger to place the third link upon the work piece; and wherein the third link drive mechanism is configured to drive the third link of each of the first finger and second finger to apply a sufficient clamping force upon the work piece to enable the gripping device to grip, lift, and transport the work piece.

19. The reconfigurable gripping device of claim 18 wherein the first plurality of actuators is a plurality of electric motors and the second plurality of actuators is a plurality of electric motors.

20. The reconfigurable gripping device of claim 18 wherein the third actuator is a pneumatic cylinder.

* * * * *